W. CLOTHIER.
AUTOMATIC WEIGHING MACHINE.
APPLICATION FILED NOV. 24, 1916.

1,238,886.

Patented Sept. 4, 1917.
3 SHEETS—SHEET 1.

Witnesses
H. Harwood
C. R. Ziegler

Inventor
Willis Clothier
By Joshua R. H. Potts
His Attorney

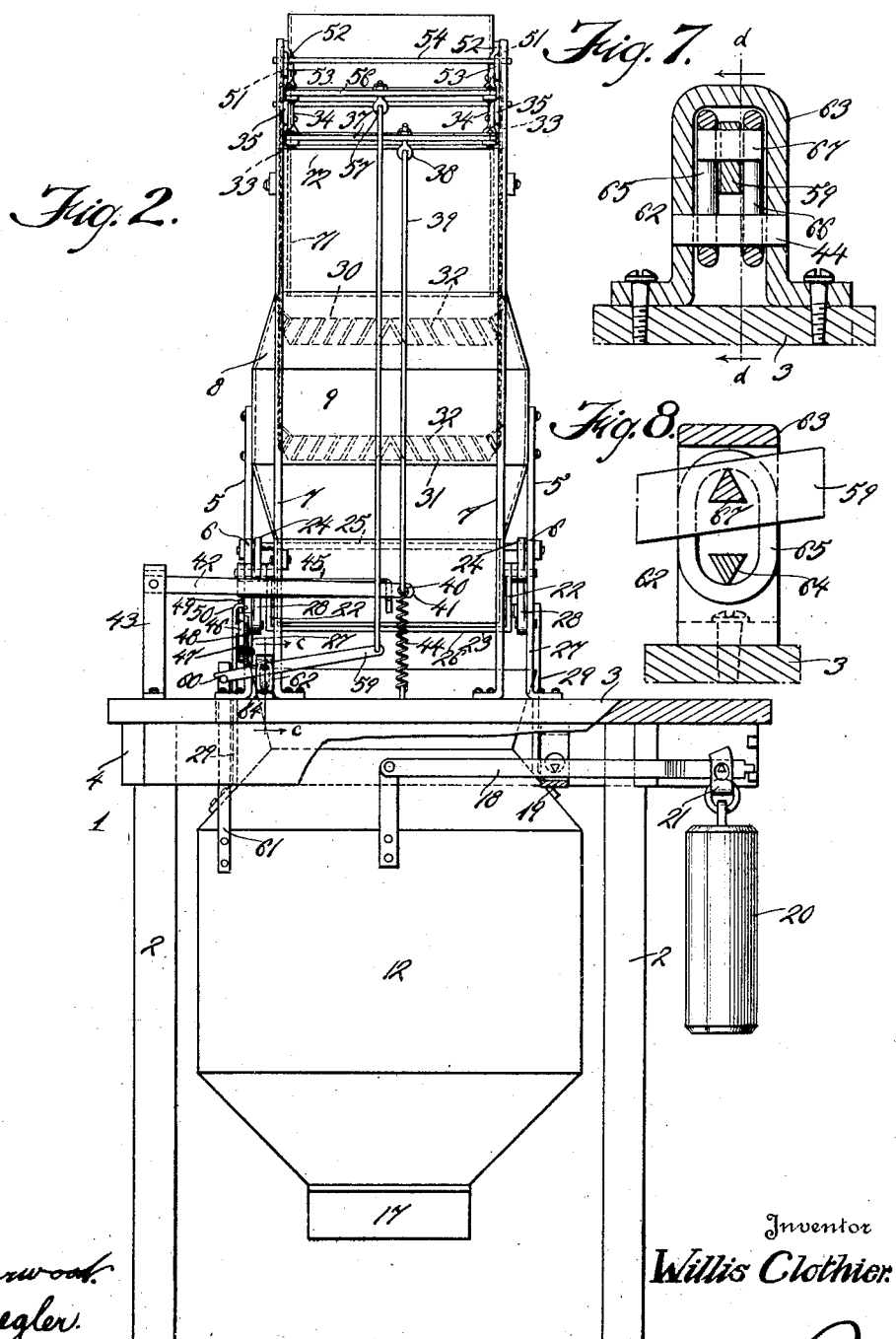

W. CLOTHIER.
AUTOMATIC WEIGHING MACHINE.
APPLICATION FILED NOV. 24, 1916.
1,238,886.
Patented Sept. 4, 1917.
3 SHEETS—SHEET 3.
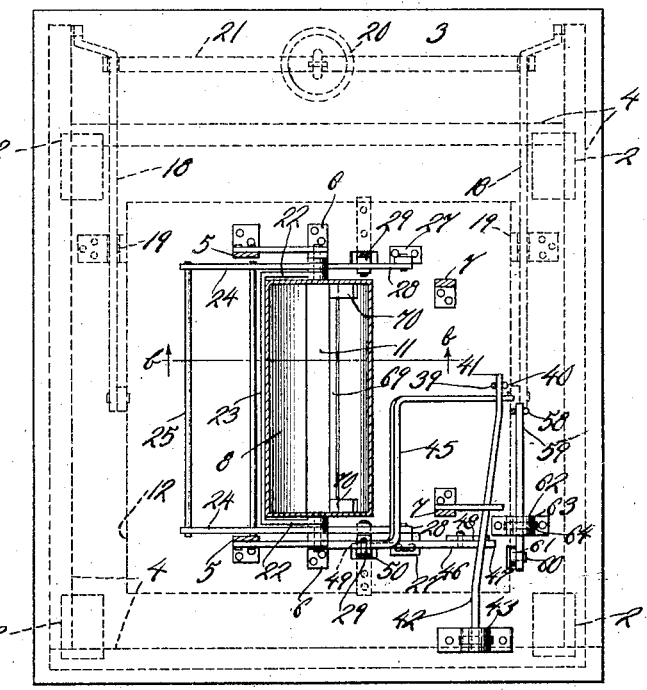
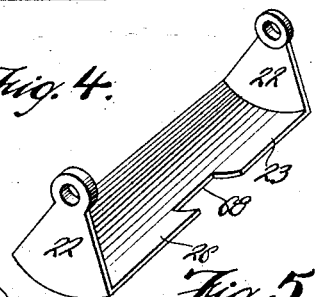
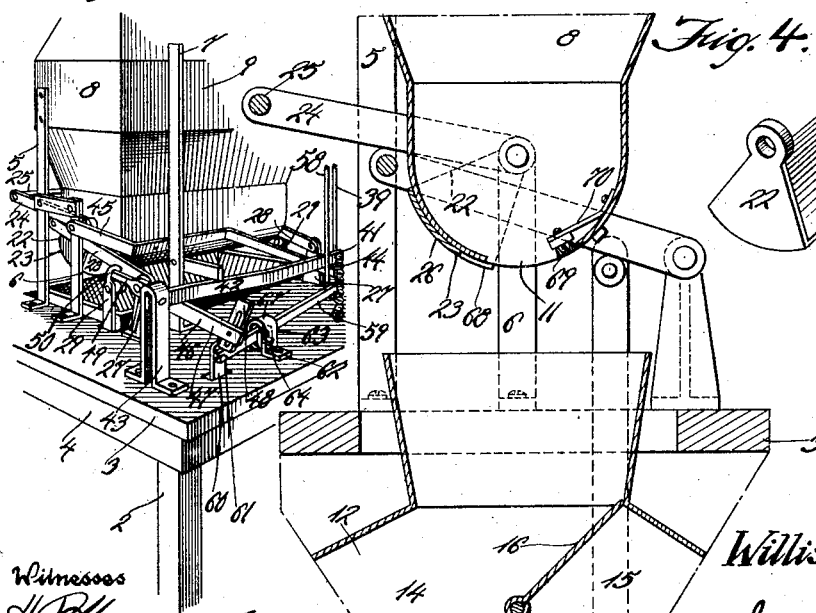

UNITED STATES PATENT OFFICE.

WILLIS CLOTHIER, OF NEW CASTLE, DELAWARE.

AUTOMATIC WEIGHING-MACHINE.

1,238,886. Specification of Letters Patent. Patented Sept. 4, 1917.

Application filed November 24, 1916. Serial No. 133,253.

*To all whom it may concern:*

Be it known that I, WILLIS CLOTHIER, a citizen of the United States, residing at New Castle, in the county of New Castle and State of Delaware, have invented certain new and useful Improvements in Automatic Weighing-Machines, of which the following is a specification.

My invention consists of an improved automatic weighing machine which is especially useful for weighing grain or granular material, of different kinds, during its passage from one receptacle to another.

Different kinds of grain, such for example as wheat, oats, and corn, owing to their different specific gravities, shape, and bulk, fall at different speeds and ordinarily require separate and special attention when being weighed. One object of my invention is to provide a weighing machine which is self-adjustable to accurately weigh grains of different kinds without in any way requiring change in any of the parts of the machine, such for example as the shifting of weights or the like as is necessary in a number of machines now on the market.

Another object is to provide a machine of the above described type which will be of simple construction, and which can be cheaply and quickly manufactured and installed.

A still further object is to so construct my improved machine that it will be durable, and of positive action.

These objects, and other advantageous ends which will be described hereinafter, I attain in the following manner, reference being had to the accompanying drawings in which—

Fig. 2 is a right hand side view of Fig. 1.

Fig. 3 is a sectional plan view taken on the line $a$—$a$ of Fig. 1.

Fig. 4 is an enlarged fragmentary sectional view taken on the line $b$—$b$ of Fig. 3 showing my improved gate and gate controlling means, together with means for keeping the gate clean.

Fig. 5 is a perspective view of my improved gate.

Fig. 6 is a fragmentary perspective view of my invention showing certain of the levers which I employ.

Fig. 7 is an enlarged section on the line $c$—$c$ of Fig. 2 through a swinging bearing which I employ, and Fig. 8 is a section on the line $d$—$d$ of Fig. 7.

Figure 1:
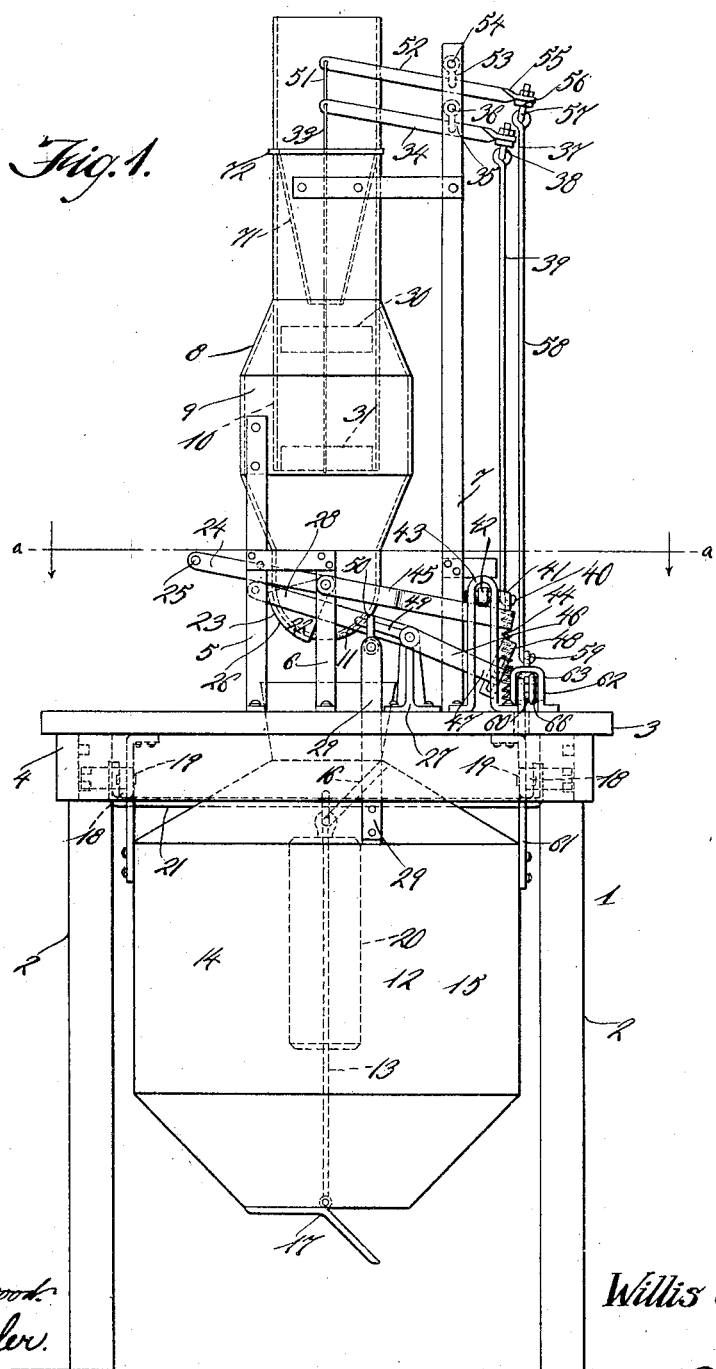
Figure 1 is a front elevation of my improved weighing machine.

Referring to the drawings, a supporting frame 1 comprises legs 2, a table or supporting board 3, and binding members 4 which tend to secure the legs together at their tops.

Uprights 5, 6, and 7, are preferably made of strap metal and secured to the upper portion of the table 3. These uprights form a support for a spout 8 which is preferably made of sheet metal and hollow to form a passage for the grain as it falls from a superimposed hopper (not shown). The spout 8 is preferably made wide adjacent its middle portion as shown at 9 and includes a depending sleeve 10 which forms a central guide-way for the grain as the latter falls through said spout.

The lower end of the spout 8 is curved as clearly shown in Figs. 1 and 4, and has an opening 11 in its bottom, said opening being designed to permit the grain to drop from the spout into the weighing receptacle 12. This weighing receptacle may be of any shape or design, but as illustrated is of the same general construction as that disclosed in my United States Patent No. 1,061,983, granted May 20, 1913, the same having a central vertical partition 13 which divides the receptacle into two chambers 14 and 15, there being a swinging gate 16 which is movable into either of two positions to deflect the grain alternately into the chambers 14 and 15.

A hinged bottom 17 is provided and is so connected with the gate 16 that when the latter is positioned to deflect the grain into one of the chambers, the bottom will be correspondingly moved to close that chamber at its bottom.

The controlling means for operating the gate and bottom is not illustrated in the present application, since it is described and illustrated in my above mentioned patent.

The receptacle 12 is suspended on a scale beam 18, the latter having a fulcrum 19, said fulcrum being supported by the table 3 as clearly shown in Figs. 2 and 3.

A weight 20 is mounted on a swinging bar 21, the latter being supported by the rear end of the scale beam 18. The two uprights 6 form a pivot support for the substantially triangular shaped ends 22 of a gate 23, the latter being designed to cut off the flow of grain from said spout into the receptacle when the proper amount of grain has descended into said receptacle. To this end I provide two arms 24 which are operatively connected to the triangular ends 22 of the gate 23 and movable on the same pivot as said gate. These arms at their outer ends are preferably provided with a rod 25 to provide additional weight, it being understood that the weight of the arms 24 is sufficient to swing the gate 23 into a position to close the opening 11 in the spout 8, it being further noted that the base or closure plate 26 of said gate 23 is curved and of substantially the same contour as the outer curved surface of the lower end of said spout 8, and that the axis of said gate is substantially coincident with the center of curvature of the curved lower surface of the spout 8.

It will thus be understood that unless the arms are held in an upward position, that they normally fall by gravity to effect the closing of the gate 23. Standards 27 are mounted on the table 3 and form pivotal supports for two gate-opening arms 28. These arms 28 are mounted directly below and in the same vertical planes as the respective arms 24, so that said arms 28 operate to engage the lower edges of the arms 24 to either raise the latter or to permit them to fall as will be hereinafter more completely described.

Two posts 29 are secured to the receptacle 12 at opposite sides thereof. These posts 29 have their upper ends so designed as to engage the lower edges of the arms 28 and to hold the latter in positions according to the position of said receptacle. For example, if the receptacle is lowered, the posts 29 will be lowered, thereby permitting the arms 28 to be correspondingly lowered due to their own weight, and consequently permitting the arms 24 to be lowered to close the gate 23. However, it will be understood that when the receptacle 12 is in a raised position, the posts 29 will hold the arms 28 in an elevated position, such for example as shown in Fig. 1, and the arms 28 in turn will hold the arms 24 in such position as to permit the gate to remain open and the grain to flow through the spout into the receptacle.

In order to secure an accurate weight of the grain, I suspend two frames 30 and 31 within the sleeve 10. Each of these frames 30 and 31 include a series of angularly disposed vanes 32, said vanes being so arranged within the respective frames 30 and 31 that the grain which passes downwardly through the upper portion of the spout 8 forms an impact with said vanes and eventually slides between them during its progress toward the bottom of the spout.

The upper frame 30 is suspended by means of wires 33 which in turn are connected to the ends of levers 34 which are hung from loops 35, the latter being suspended on a rod 36. The levers 34, at their outer ends are connected by a bar 37 and the latter is adjustably secured by an eyebolt 38 to the upper end of a link 39, the latter having a lower hooked end 40 which extends through an opening adjacent the free end 41 of a lever 42, the latter being pivoted in a stanchion 43.

A coiled spring 44 connects said free end 41 of the lever 42 with the upper portion of the table 3, so that the weight 31 of said frame will be resisted by the spring 44, and any movement imparted to the link 39 will likewise be imparted to the lever 42.

A lever 45 is operatively connected to the gate 23 and to the arms 24. This lever 45 is bent in the shape clearly shown in Figs. 3 and 6 so as to pass along the front, and then to the rear of the spout, and then in a direction so as to be positioned immediately below the free end 41 of the lever 42.

A double ended lever 46 is pivoted between its ends to the front standard 27. The end 47 of said lever 46 is provided with an adjustable plate 48 designed, under certain conditions hereinafter more clearly described, to engage the lower edge of the lever 42 and raise it against the tension of the spring 44 to permit the gate 23 to completely close. The end 49 of the lever 46 is designed to be engaged by a hook 50 which is mounted on the top of one of the posts 29.

The frame 31 is suspended by wires 51, the latter being attached to levers 52 which are swung on loops 53, the latter being supported by a rod 54. The outer ends 55 of the levers 52 are provided with a bar 56, and an eyebolt 57 extends through said bar 56 and forms a support for the upper end of a link 58.

The lower end of the link 58 is connected to one end of a lever 59, the opposite end of said lever 59 being designed to engage a bearing member 60 which is mounted on an extension 61, the latter being secured to the receptacle 12. The lever 59 is retained by a swinging bearing 62 which consists of an inverted staple or housing 63 having a pivot bar 64 extending therethrough, said pivot bar being engaged by the lower inner surfaces of two elliptical rings 65 and 66.

The lever 59 has a pivot bar 67 extending therethrough which engages the upper inner surfaces of said rings 65 and 66, so that an upward movement of the link 58 will impart a downward movement to the extension 61 and consequently to the receptacle 12.

It will be understood that a downward movement of the frame 30 will tend to impart a downward movement to the receptacle 12 and thereby cause the gate to move toward its closed position irrespective of the actual weight of the grain then in the receptacle.

This latter mentioned construction provides a compensator to prevent the grain from rushing into the receptacle uncontrolled as will be hereinafter more fully explained in the operation of the machine.

The base or bottom of the gate 23 has an opening or cut-out portion 68, and a brush 69 is so mounted within the opening 11 that as the gate 23 closes, the brush will act to clear the gate of any dust or material which would prevent the proper closure of the gate. This brush 69 extends entirely across the lower end of the spout 8 as clearly shown in Figs. 3 and 4, and is mounted on resilient arms 70, the latter being attached to the inner surface of said spout.

A funnel 71 is mounted within the upper portion of the spout 8, and this funnel converges downwardly so as to guide the falling grain directly to the vanes 32 of the upper frame 30, the wires 32 and 51 of the levers 34 and 35 passing down through openings at the side of said funnel so as to properly support their frames 30 and 31. The funnel 71 is provided with an upper flange 72 which rests on the upper edge of the spout 8, so that the funnel may be bodily removed when it is desired to remove either of the frames 30 or 31 for inspection or cleaning purposes.

It will be understood that when the receptacle 12 is empty, the weight 20 overbalances and holds the receptacle in its uppermost position, and that when in this position, the posts 29 are holding the arms 28 in their uppermost position, and the latter are holding the arms 24 in such position as to completely open the opening 11 and thereby permit the grain to flow into the receptacle. When in this position, the lever 45 will be below the free end 41 of the lever 42, but will not be touching it, and the grain as it dribbles between and impacts against the vanes in the frame 30, will merely act to vibrate the lever 42 without performing any function.

In the same manner, the grain as it passes through the frame 30, will tend to move the latter downwardly, but since the weight 20 is far heavier than the force exerted to move the receptacle 12 downwardly through the medium of the lever 59, the action of said grain against the frame 31 will be practically of no effect. However, when the amount of grain in the receptacle is practically equal, in aggregate with the weight of the receptacle, to the weight 20, the impact of the grain on the frame 30 will tend to move the latter downwardly and consequently move the receptacle 12 downwardly against the action of the weight 20. This downward movement of the receptacle 12 permits the arms 28 and 24 to fall until the lever 45 moves up sufficiently to contact with the lower edge of the lever 42. This movement partially closes the gate 23, which cuts off the main supply of grain to the receptacle.

When the supply is thus cut off, the downward pressure on the receptacle through the medium of the lever 59 will be removed, and the receptacle will gradually move upwardly due to the influence of the weight 20 and thereby again effect an opening movement to the gate. However, the amount of grain passing therethrough will gradually become less and just prior to the time that the grain and receptacle tend to balance the weight, the lever 45 will be under the control of the lever 42 due to the engagement of the levers as just described.

When the lever 45 engages the lever 42, the gate 23 is thrown under the control of the frame 31, so that as the grain passes through said latter frame, the impact imparts a vibration to the lever 42, and a dribble of grain is produced which gradually causes the receptacle to overbalance the weight 20. The hook 50 is so positioned with respect to the end 49 of the lever 46 that the hook engages said end 49 of the lever 46 when the receptacle receives its overbalancing movement, and has the proper amount of grain therein.

The effect of the engagement of the end 49 of the lever 46 by the hook 50 is to move the plate 48 upwardly so as to raise the lever 42 and thereby free the outer end of the lever 45, and when thus freed, the weight of the arms 24 will automatically cause the gate 23 to completely close.

It will be noted that by having the gate 23 cut away as shown at 68, that when the dribbling action of the grain takes place, a comparatively small opening is provided by said gate. However, when the arms 24 act to completely close the gate as just described, it will be understood that the cut out portion 68 of the gate is moved beyond the opening in the spout 8 and the solid portion of the gate completely closes the opening. It will be further noted that grains of different shape and size naturally have a different effect upon the frames 30 and 31, the heavier the grain, the more the same is kept under control, so that with my improved machine it is possible to weigh oats, wheat, corn, barley, or other different kinds of grain without requiring any manual change in the construction or positioning of the parts, since the construction is such to accommodate and compensate for differences in the nature of the material being weighed.

My improved machine thus provides means operative by the flow of the grain through the spout to control the opening and closing movement of the gate, both through the medium of the receptacle and also through the medium of the gate operating levers direct.

While I have illustrated a special form of receptacle, it will be understood that I may use different forms of receptacles without departing from the spirit of my invention.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A weighing machine including a spout having an opening, a gate for closing said opening, and means movable by impact of the material to be weighed, said means being operative by said material prior to passing out of said opening to effect movement of said gate, substantially as described.

2. A weighing machine including a spout having an opening therein, a gate movable to close said opening, a receptacle for receiving material passing through said spout and opening, means on said receptacle for normally holding the gate open, and means operative by impact of the grain prior to passing out of said opening to move said receptacle downwardly to effect the closing movement of said gate, substantially as described.

3. A weighing machine including a spout having an opening therein, a gate movable to close said opening, a receptacle for receiving material passing through said spout and opening, means on said receptacle for normally holding the gate open, means operative by impact of the grain to move said receptacle downwardly to effect the closing movement of said gate, and a second means operative by the impact of said grain to control the opening and closing movement of said gate, substantially as described.

4. A weighing machine including a spout, a frame within said spout having a plurality of vanes therein, and additional means within said spout for guiding material to impact with and to pass between said vanes, substantially as described.

5. A weighing machine including a spout, a frame within said spout having a plurality of vanes therein, and a funnel depending within said spout for guiding material to impact with said vanes and to pass therebetween, substantially as described.

6. A weighing machine including a spout having an opening, a gate for closing said opening, said gate having a cut-out portion to provide a relatively small passage for material under said opening, means movable by the impact of the material to be weighed, said means being operative by the material prior to passing out of said opening to effect movement of said gate into various partially closed positions, and means for effecting the movement of the gate to entirely close the opening, substantially as described.

7. A weighing machine including a spout having an opening, a gate for closing said opening, a brush, means forming a resilient support for said brush and located within the opening, said brush normally being located between the ends of the path of movement of said gate to permit the inner surface of the front edge portion of the gate to pass by the brush and to be cleaned thereby, substantially as described.

8. A weighing machine including a spout having an opening, a gate for closing said opening, means movable by impact of the material to be weighed, said means being operative to effect movement of said gate, a receptacle, a scale beam supporting said receptacle, means operative by impact of material to effect a lowering movement of said receptacle, and means operative by said lowering movement of said receptacle to render said first impact means ineffective, substantially as described.

9. A weighing machine including a spout having an opening, a gate for closing said opening, means movable by impact of the material to be weighed, said means being operative to effect movement of said gate, a receptacle, a scale beam supporting said receptacle, means operative by impact of material to effect a lowering movement of said receptacle, means operative by said lowering movement of said receptacle to render said first impact means ineffective, and means operative by gravity to completely close said opening by the gate when said latter means is rendered ineffective, substantially as described.

10. A weighing machine including a spout having an opening, a gate for closing said opening, and means movable by impact of the material to be weighed, said means including a lever operatively connected to said gate, a second lever for engagement with said first lever, and means operative by gravity to hold said first lever into engagement with said second lever, substantially as described.

11. A weighing machine including a spout having an opening, a gate for closing said opening, means movable by impact of the material to be weighed, said means including a lever operatively connected to said gate, a second lever for engagement with said first lever, means operative by gravity to hold said first lever into engagement with said second lever, and a spring operative to hold said first lever under the control of the second lever to receive movement by said second lever due to the impact of the material to be weighed, substantially as described.

12. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, substantially as described.

13. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, and means operative during the final downward movement of the receptacle to move said second lever out of engagement with said first lever to permit said first arms to completely close said gate, substantially as described.

14. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, means operative during the final downward movement of the receptacle to move said second lever out of engagement with said first lever to permit said first arms to completely close said gate, said latter means including a double ended lever, a hook for engaging one end of the lever and operative by the downward movement of the receptacle, and means adjustable on the other end of the double ended lever to engage said second lever, substantially as described.

15. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, and means operative during the final downward movement of the receptacle to move said second lever out of engagement with said first lever to permit said first arms to completely close said gate, a second means operative by the impact of the material to be weighed, and means connecting said latter impact means and operative to force said receptacle downwardly, substantially as described.

16. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, and means operative during the final downward movement of the receptacle to move said second lever out of engagement with said first lever to permit said first arms to completely close said gate, a second means operative by the impact of the material to be weighed, and means connecting said latter impact means and including a lever operative to depress said receptacle, substantially as described.

17. The combination in a weighing machine, of a spout having an opening therein, a receptacle to receive material falling through said opening, a pivoted gate for closing said opening, arms operatively connected with said gate, additional arms for supporting said first arms, posts on said receptacle for supporting said additional arms, a scale beam supporting said receptacle, a lever operatively connected to said gate, a second lever designed to be engaged by said first lever, means operative by impact of material passing through said spout, said means being connected to said second lever, a spring connected to said second lever, said first lever being normally held out of engagement with said second lever by the engagement of the post with said second arms, said first arms being operative to move said first lever into engagement with the second lever when said posts are moved downwardly by the downward movement of the receptacle and thus partially close the gate, means operative during the final downward movement of the receptacle to move said second lever out of engagement with said first lever to permit said first arms to completely close said gate, a second means operative by the impact of the material to be weighed, means connecting said latter impact means and including a lever operative to depress said receptacle, said lever having a swinging bearing, substantially as described.

In testimony whereof I have signed my name to this specification in the presence of two subscribing witnesses.

WILLIS CLOTHIER.

Witnesses:
 IGNACE A. HART,
 PINKUS B. KANOPHY.